(12) United States Patent
Chan et al.

(10) Patent No.: US 9,990,499 B2
(45) Date of Patent: Jun. 5, 2018

(54) DYNAMIC SECURITY TESTING

(71) Applicant: Netflix, Inc., Los Gatos, CA (US)

(72) Inventors: Jason Chan, Campbell, CA (US); Patrick Kelley, Campbell, CA (US); Benjamin Hagen, San Francisco, CA (US); Samuel Reed, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 328 days.

(21) Appl. No.: 13/959,640

(22) Filed: Aug. 5, 2013

(65) Prior Publication Data
US 2015/0040229 A1   Feb. 5, 2015

(51) Int. Cl.
*G06F 21/57* (2013.01)

(52) U.S. Cl.
CPC ................... *G06F 21/577* (2013.01)

(58) Field of Classification Search
CPC ............................ G06F 21/57; G06F 21/577
See application file for complete search history.

(56) References Cited

U.S. PATENT DOCUMENTS

| | | | | |
|---|---|---|---|---|
| 7,234,166 B2* | 6/2007 | Nurmela | ................. | G06F 21/55 726/22 |
| 7,421,491 B2* | 9/2008 | Tameda | .................. | H04L 63/20 709/224 |
| 8,380,889 B2* | 2/2013 | Sretenovic | ........... | G06F 3/1219 358/1.14 |
| 2002/0066034 A1* | 5/2002 | Schlossberg | .......... | G06F 21/552 726/23 |
| 2002/0078381 A1* | 6/2002 | Farley | ................... | G06F 21/552 726/23 |
| 2002/0111698 A1* | 8/2002 | Graziano | ............... | G05B 15/02 700/17 |
| 2002/0178382 A1* | 11/2002 | Mukai | ................. | H04L 63/1425 726/4 |
| 2002/0178383 A1* | 11/2002 | Hrabik et al. | ................. | 713/201 |
| 2005/0160286 A1* | 7/2005 | Currie et al. | ................. | 713/200 |
| 2006/0085852 A1* | 4/2006 | Sima | ..................... | G06F 21/552 726/22 |
| 2007/0022480 A1* | 1/2007 | Newman | ................. | G06F 21/64 726/24 |
| 2008/0209567 A1* | 8/2008 | Lockhart | ............. | G06F 11/3612 726/25 |

* cited by examiner

*Primary Examiner* — Saleh Najjar
*Assistant Examiner* — Devin E Almeida
(74) *Attorney, Agent, or Firm* — Artegis Law Group, LLP (57) ABSTRACT

A method and system for discovering and testing security assets is provided. Based on source definition data describing sources to monitor on the one or more computer networks, an example system scans the sources to identify security assets. The system analyses the security assets to identify characteristics of the server-based applications. The system stores database records describing the security assets and the identified characteristics. The system queries the database records to select, based at least on the identified characteristics, one or more target assets, from the security assets, on which to conduct one or more security tests. Responsive to selecting the one or more target assets, the system conducts the one or more security tests on the one or more target assets. The system identifies one or more security vulnerabilities at the one or more target assets based on the conducted one or more security tests.

20 Claims, 4 Drawing Sheets

DYNAMIC SECURITY TESTING

TECHNICAL FIELD

The present disclosure relates to security testing of dynamically-discoverable security assets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The attack surface of a computer system consists of the components within that computer system that are exposed to access by a potential attacker. Such components may include, for instance, applications executed by a web server and other server-based applications. It is typically desirable for user-operated clients to interact with these components over one or more computer networks. Thus the components feature various interfaces for interacting with clients over those one or more networks. For example, the components may expose web-based graphical user interfaces ("GUIs") comprising user input fields, interfaces for receiving user input via predefined protocols such as Hyper-Text Transfer Protocol ("HTTP") or Simple Object Access Protocol ("SOAP"), customized application programming interfaces ("APIs"), and/or other services by which the components receive and react to communications from user-operated client devices.

While user access to the components is typically desirable, providing the user access sometimes leaves the components vulnerable to unauthorized uses, in which an unauthorized user succeeds in causing the components to execute in manners that are unintended or undesired by the owner of the computer system. Examples of unauthorized uses, which are also known as "attacks," include without limitation: passive attacks, such as wiretapping, and active attacks such as server or account hijacking, buffer overflow, heap overflow, and format string attacks.

The information security industry is continually discovering and defining "security vulnerabilities" that are known to be at high risk for such attacks. Security vulnerabilities may include, for example, specific versions of software known to inadvertently expose access to undesired functionality, bad practices in software development or deployment, and so forth. Vulnerabilities to attacks increase when the components are accessible to clients over an insecure network. An insecure network is a network over which limited or no control is exercised over the users that can access the network. One example of an insecure network is the Internet.

One approach to improving information security is to reduce the attack surface of a computer system. By turning off unnecessary functionality and/or components, there are fewer security risks. By having less code available to unauthorized actors, there will tend to be fewer failures. Conventional strategies of information security thus focus on attack surface reduction by reducing the amount of code running, reducing entry points available to untrusted users, and eliminating services requested by relatively few users. To achieve this end, organizations typically feature a centralized information technology department that approves and authorizes any new component exposed to access from insecure external networks, and in some cases even approves and authorizes components that are exposed to access from internal networks, such as the organization's Intranet. These strong controls over the deployment of security assets can often stymy the progress of development in fast-paced organizations.

SUMMARY OF THE INVENTION

The appended claims may serve to summarize the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Approaches, techniques, and mechanisms are disclosed for detecting security vulnerabilities in a computing environment. Among other effects, the approaches, techniques, and mechanisms are effective even in computing environments with limited supervision over the attack surface, thus avoiding the need for strong controls over the deployment of assets that are accessible to insecure networks.

According to an embodiment, a computer system for discovering and testing security assets comprises: a first repository of source definition data describing sources to monitor on one or more computer networks; one or more input collectors, coupled to the one or more computer networks, that are configured to scan the sources to identify security assets, wherein the security assets comprise server-side interfaces by which server-based applications interact with client computers over the one or more computer networks; a second repository of security asset data that is configured to receive, from the one or more input collectors, data describing the identified security assets; a security asset analysis component, coupled to the second repository, that is configured to analyze the security assets described by the security asset data to identify characteristics of the security assets, and that is configured to update the repository to associate each of the security assets with a corresponding one or more of the identified characteristics; a query component, coupled to the repository of security asset data, that is configured to receive queries for particular security assets having one or more particular characteristics, and that is configured to receive the particular security assets from the repository of security asset data based in part on comparing the one or more particular characteristics to the identified characteristics; a test management engine, coupled to the one or more computer networks, that is configured to receive requests to execute security tests on target assets of the security assets, and that is configured to identify security vulnerabilities based on executing the security tests on the target assets; a third repository of security test data that is configured to receive, from the test management engine, results for the security tests, including vulnerabilities data describing the security vulnerabilities; a reporting component that is configured to generate reports of the identified security vulnerabilities based on the repository of security test data.

In an embodiment, the one or more input collectors include one or more of: an Internet Protocol scanner that scans ranges of addresses specified by the source definition data; a virtual server scanner that accesses virtual server account configuration data, at locations specified by the source definition data, to identify virtual server instances; a Domain Name Server scanner that scans domain name server records specified by the source definition data. In an embodiment, the one or more input collectors are configured to periodically scan the sources to identify new security assets that come online over the one or more computer networks.

In an embodiment, the test management engine is configured to receive a first request, of the requests, to execute a first set of the one or more security tests on a first set of particular security assets retrieved by the query component. In an embodiment, the system further comprises: a prioritization component, coupled to or embedded in the query component, that is configured to generate priority data for sets of particular security assets based on corresponding characteristics of the identified characteristics. The test management engine is further configured to receive the priority data and test the target assets in orders indicated by the priority data. In an embodiment, the system further comprises: a scheduling component that is configured to cause a particular target asset of the target assets to be submitted to the test management engine at least because a certain period of time has elapsed since the particular target asset was last tested.

In an embodiment, the system further comprises: one or more monitoring components, coupled to the one or more computer networks, that are configured to detect changes to the security-based applications, and that are configured to cause a particular target asset of the target assets to be submitted to the test management engine at least because a particular change has been monitored with respect to a particular server-based application corresponding to the particular target asset. In an embodiment, the one or more monitoring components include one or more of: an inventory monitoring component that is configured to monitor the security asset data for changes in the security asset descriptions or identified characteristics; a versioning monitoring component that is configured to monitor versioning information associated with the security assets; a site content monitoring component that is configured to monitor for changes in web pages output from the security assets; a source code monitoring component that is configured to monitor for changes in source code associated with the security assets; or an application programming interface monitoring component that is configured to monitor for changes in application programming interfaces associated with the security assets.

In an embodiment, the security asset data for a particular security asset of the security assets include one or more of: a location at which the particular security asset is accessible, wherein the location is one of an Internet Protocol address or hostname; one or more available ports at the location; a first timestamp for when the particular security asset was first identified based on scanning the sources; a second timestamp for when the particular security asset was last identified based on scanning the sources; a third timestamp for when a particular set of one or more of the one or more security tests was last performed on the particular security asset; one or more application services provided by the particular security asset; contact information for a project owner for the particular security asset; a description of the particular security asset; an indication of whether the particular security asset is accessible from a particular external Internet Protocol address; an indication of whether the particular security asset is behind a load balancer; an indication of whether the particular security asset is an encrypted service; a certificate authority that issued a Secure Socket Layer certificate for the particular security asset; Secure Socket Layer characteristics associated with the particular security asset; an indication of whether the particular security asset provides an input component for receiving user credentials; a count of input fields found in a website provided by the particular security asset; one or more input field types found in a website provided by the particular security asset; one or more software packages upon which the particular security asset relies; user credentials under which the particular security asset executes one or more particular server-based applications; a hosting provider that hosts the particular security asset; or a measurement metric of distance from the security asset to a particular host domain.

In an embodiment, the system further comprises: a logic component that is configured to automatically select which security tests, of a plurality of possible security tests, to perform on which security assets, based on the identified characteristics.

According to an embodiment, a data processing method comprises: based on source definition data describing sources to monitor on one or more computer networks, scanning the sources to identify security assets, wherein the security assets comprise server-side interfaces by which server-based applications interact with client computers over the one or more computer networks; analyzing the security assets to identify characteristics of the server-based applications; storing database records describing the security assets and the identified characteristics; querying the database records to select, based at least on the identified characteristics, one or more target assets, from the security assets, on which to conduct one or more security tests; responsive to selecting the one or more target assets, conducting the one or more security tests on the one or more target assets; and identifying one or more security vulnerabilities at the one or more target assets based on the conducted one or more security tests.

In an embodiment, the source definition data comprises source definitions that are classified according to source definition categories, wherein the source definition categories include at least: a first category for first source definitions that specify ranges of addresses to scan for security assets; a second category for second source definitions that specify how to access virtual server account configuration data, from which to identify virtual server instances to scan for security assets; and a third category for third source definitions that specify domain name server records from which to resolve addresses to scan for security assets.

In an embodiment, identifying the security assets comprises identifying, for each particular security asset, a location at which the particular security asset is accessible, and one or more available ports at the location, wherein the location is one of an Internet Protocol address or hostname. In an embodiment, the method further comprises periodically scanning the sources to identify new security assets that come online over the one or more computer networks.

In an embodiment, the method further comprises: monitoring the security assets for changes to the server-based applications. Selecting the one or more target assets comprises selecting a particular target asset of the one or more target assets at least because a particular change has been monitored with respect to a particular server-based application corresponding to the particular target asset. In an embodiment, monitoring the security assets for changes comprises one or more of: monitoring the database records for changes in the security asset descriptions or identified characteristics; monitoring versioning information associated with the security assets; monitoring for changes in web pages output from the security assets; monitoring for changes in source code associated with the security assets; or monitoring for changes in application programming interfaces associated with the security assets.

In an embodiment, the method further comprises: prioritizing the security assets based on the identified characteristics. Selecting the one or more target assets comprises selecting based on the prioritizing. In an embodiment, the method further comprising: scheduling jobs to execute periodic security tests for particular assets having one or more particular identified characteristics. Selecting the one or more target assets as part of selecting to run the scheduled jobs.

In an embodiment, the method further comprises automatically selecting which security tests, of a plurality of possible security tests, to perform on which security assets, based on the identified characteristics.

In other aspects, the invention encompasses a computer apparatus and a computer-readable medium configured to carry out the foregoing steps.

2.0. Functional & Structural Overview

Figure 1:
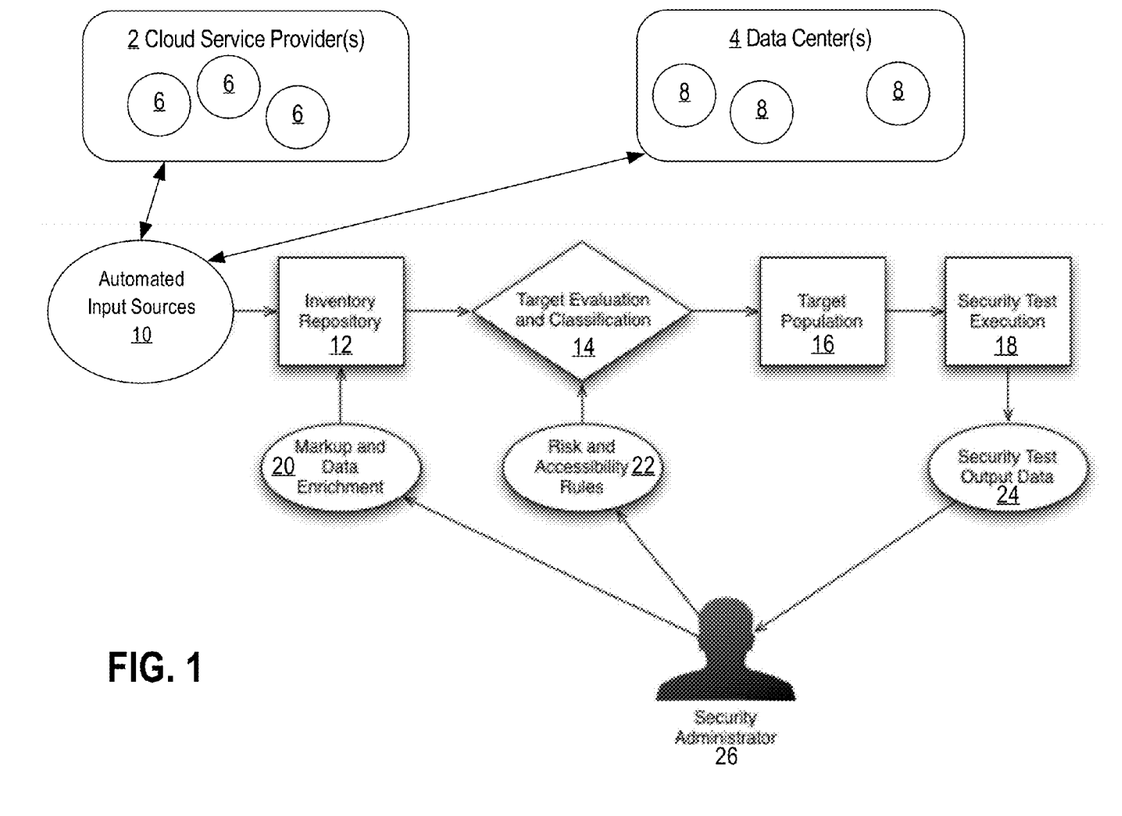
FIG. 1 illustrates a high-level view of principal functional elements of an embodiment.

FIG. 1 illustrates a high-level view of principal functional elements of an embodiment. In an embodiment, one or more automated input sources 10 are configured to obtain data relating to functional elements that are defined, deployed or active in one or more of cloud service providers 2 and/or data centers 4. The one or more cloud service providers 2 host or execute a plurality of application instances 6, comprising images of applications and operating systems that have been deployed to computing hardware that is owned or operated by the cloud service providers and used for the benefit of an account owned by a particular enterprise or other user. Additionally or alternatively, one or more data centers 4 may host or execute a plurality of application instances 8. The data centers 4 may be owned or operated by the same entity that implements the functional elements of FIG. 1, or may be associated with a different entity.

For purposes of illustrating a clear example, FIG. 1 shows a limited number of instances 6, 8 in cloud service providers 2 and data centers 4, respectively. In a practical embodiment, there may be any number of instances, and the number and images used to instantiate and deploy the instances vary over time. Consequently, from the standpoint of a test system, the cloud service providers 2 and data centers 4 represent a constantly changing computing environment in which the details of all then-currently deployed instances may be difficult to track, determine, and use in testing.

In an embodiment, the automated input sources 10 may obtain information about the instances 6, 8 and/or other configuration or deployment information for functional elements at cloud service providers 2 and/or data centers 4 by issuing function calls according to a management API that is implemented at the cloud service providers or data centers. Additionally or alternatively, automated input sources 10 may use device discovery protocols or service discovery protocols to listen for announcements about available devices or services or to flood networks associated with cloud service providers 2 and/or data centers 4 with requests for information from devices or services that are compatible with the protocols. Based on events or notifications that the automated input sources 10 receive on listening ports, and/or based on responses under the discovery protocols, the automated input sources may create and store records in an inventory repository 12 that describe the name, nature, configuration and other details pertaining to instances 6, 8 or other elements of the cloud service providers 2 and/or data centers 4. Inventory repository 12 may comprise a relational database, object data store, flat file, folder, directory, or other data repository.

In an embodiment, a security administrator 26 or other user may apply markup and data enrichment 20 operations to data in the inventory repository 12, resulting in modifying records in the inventory repository to include tags, markers, new fields, modified fields, deleted fields or other data that indicates whether a record identifies a functional element that is suitable for testing or should be a target of testing. For example, markup and data enrichment operations 20 may specify that particular instances 6, 8 are mission-critical production instances that require extensive testing, or are canary instances representing new versions of applications that have been recently deployed and need moderate levels of testing, or are well-known third party applications that require less or no testing.

In an embodiment, the inventory repository 12 is coupled to an input of a target evaluation and classification module 14, which is configured to generate a target population 16 of elements for testing. The target evaluation and classification module 14 may operate according to risk and accessibility rules 22 that the security administrator 26 may define. Rules 22 may specify types of content, connectivity or topology position, posture such as installed software packages, or other issues having a bearing on the risk of an attack or security vulnerability of a particular target element. In an embodiment, rules 22 may implement filtering functions in target evaluation and classification module 14 that reduce the total inventory of elements in inventory repository 12 to a subset in the form of target population 16.

In an embodiment, target population 16 is coupled to security test execution module 18, which is configured to run one or more security tests on the elements in the target population and to generate security test output data 24 as a result. Security administrator 26 may inspect data 24 and determine one or more mitigation operations or other responses to risks or issues identified in the data.

In this arrangement, embodiments provide a dynamic and efficient computing system capable of identifying security risks inherent in a constantly changing set of instances 6, 8 or other functional elements in cloud service providers 2, data centers 4, or other computing elements that are subject to reconfiguration, periodic instantiation and termination, or other operations that introduce complexities into security monitoring.

The general architecture shown and described in connection with FIG. 1 may be implemented in numerous ways, and one particular implementation approach is now described as an example.

Figure 2:
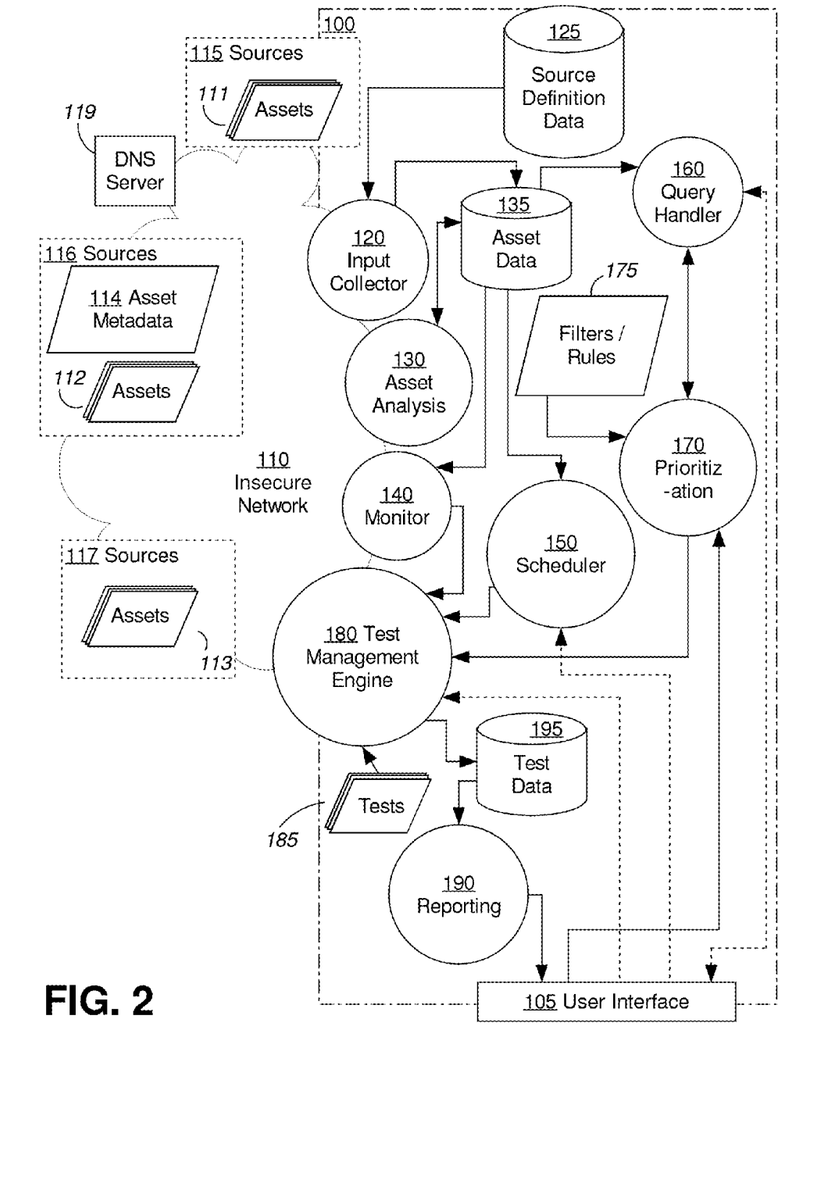
FIG. 2 illustrates an example system for discovering security assets and testing the security assets for security vulnerabilities.

FIG. 2 illustrates an example system 100 for discovering security assets 111-113 and testing for security vulnerabilities at those security assets 111-113, according to an embodiment. System 100 comprises one or more computing devices. These one or more computing devices comprise any combination of hardware and software configured to implement the various logical components described herein, including components 120-195. For example, the one or more computing devices may include one or more memories storing instructions for implementing the various components described herein, one or more hardware processors configured to execute the instructions stored in the one or more memories, and various data repositories in the one or more memories for storing data utilized by the various components.

The one or more computing devices comprise one or more network interfaces by which various components 120-190 send and/or receive messages over one or more networks. In an embodiment, the one or more networks include an internal network ("intranet") by which the various components 120-190 communicate with each other and/or other trusted computing devices. The one or more networks may also include at least one external network 110. External network 110 is an insecure network, such as the Internet, over which the owner or operator of system 100 does not exercise control, such that communications may be received from client computing devices that are not pre-approved by the owner or operator of system 100.

2.1. Security Assets

System 100 is utilized to protect various security assets 111-113 that are exposed to communications over network 110. In an embodiment, security assets 111-113 include any logical or physical component of a networked computer system that may potentially be part of the attack surface, in that the component may be accessed over an insecure network. In other embodiments, the meaning of a security asset is restricted to certain contexts. For example, in some embodiments, security assets 111-113 only include components that respond to messages received over certain Transmission Control Protocol (TCP) and/or User Datagram Protocol (UDP) ports. The certain ports may include ports that are not protected by a firewall and/or ports for reserved for use by well-known component types. In an embodiment, a security asset comprises one or more server-side interfaces by which server-based applications interact with client computers over the one or more computer networks. For example, security assets may include web servers, application servers, specific websites, specific applications, mail servers, and so forth.

In an embodiment, some security assets, such as security assets 111, are directly accessible to system 100 via an intranet. In an embodiment, some security assets, such as security assets 112 and 113 are only accessible to system 100 via the insecure network 110. Other embodiments may feature only security assets that are directly accessible to system 100 via an intranet, or only security assets that inaccessible to system 100 via an intranet.

2.2. Input Collectors

System 100 operates in an environment where security assets may be deployed without giving notice of the deployment to the system. Thus, system 100 comprises one or more input collector components 120 that execute various security asset discovery processes to identify security assets 111-113.

The input collector(s) 120 access source definition data 125 to identify sources 115-117 at which the input collectors(s) 120 should look to discover security assets 111-113. The source definition data 125 may define one or more different types of sources 115-117. Example source types may include any one or more of: ranges of Internet Protocol ("IP") addresses, specific IP addresses, domain name server records, virtual server accounts, URLs (Uniform Resource Locators), and so forth. There may be multiple sources for some or all source types, and each source has an entry in source definition data that specifies various properties of the source.

An input collector 120 may utilize any of a variety of techniques to search for security assets in the sources defined by source definition data 125. For example, in the case of a source that is a range of IP addresses, an input collector 120 may simply execute a port scan on the range by sending messages to each possible port of each possible IP address in the range. The port scan may be exhaustive, or restricted to certain port numbers. Whenever the input collector 120 receives a response, the input collector 120 identifies the combination of the responsive IP address and port number as a security asset.

As another example, in the case of a source that is a domain name server record, an input collector 120 may query a DNS server 119 for one or more IP addresses that resolve to the domain name server record. The input collector may then perform a port scan of the one or more resolved IP addresses as explained above.

As another example, in the case of a source that corresponds to a virtual server account, an input collector 120 may be configured to utilize account credentials specified by source definition data 125 to access information associated with the account, such as asset metadata 114. Asset metadata 114 specifies server and/or application instances that are exposed to insecure network 110. The input collector 120 identifies each of these instances as a security asset.

For example, a specific type of asset that is associated with a virtual server account makes use of a cluster abstraction, such as an auto-scaling group (ASG) when the asset is in a cloud computing environment hosted by Amazon Web Services (AWS), by which various application instances are associated for the purposes of automatically expanding the performance capacity of one or more assets upon an increase in demand. Each account may be associated with multiple auto-scaling groups. Asset metadata 114 may describe a variety of aspects of the application instances associated with an auto-scaling group, such as a version increment, instance type(s), system configuration(s), and so forth.

The above examples of input collectors 120 illustrate just some of the many available techniques for identifying security assets from various types of sources. In an embodiment, input collectors 120 are modular components that may easily be added to system 100, to accommodate other asset identification techniques and/or types of sources. For instance, there may be different input collectors 120 for different types of sources 115-117. In an embodiment, the input collectors 120 may all implement a common set of named functions that are accessible to the other components of system 100, such as functions for initiating the discovery process or returning any identified assets, but the input collectors 120 may each implement these common functions differently.

The one or more input collectors 120 store information specifying each identified security asset 111-113 in asset data 135. The one or more input collectors 120 may be configured to search for and identify security assets 111-113 in response to commands from an operator, on a periodic basis, and/or in response to various triggers. In an embodiment, when a previously identified security asset is no longer found, the one or more input collectors 120 will remove the security asset from asset data 135. The table below provides an example of the asset data 135 stored by one or more input collectors 120, according to an embodiment.

| Hostname/IP Address | Ports Available | Date First Seen | Date Last Seen |
|---|---|---|---|
| 10.1.1.1 | TCP80, TCP443 | 1/12/2012 01:30:30 | 4/28/2013 05:00:00 |
| mail.example.com | TCP25, TCP110 | 9/24/2012 04:15:00 | 2/21/2013 16:00:00 | instances of the asset hosted by a load balancer, a hosting provider, or a DNS or other distance metric between the asset and a designated "home" system.

The one or more asset analysis components 130 then store information describing these characteristics in association with the information specifying the security assets 111-113 in asset data 135. In essence, the one or more asset analysis components 130 may be seen as enriching the asset data 135. In an embodiment, system 100 may further feature a manual asset enrichment component that provides interfaces for a human operator to manually add or edit the characteristics stored in asset data 135. The table below illustrates an example of enriched asset data, according to an embodiment.

| Hostname/IP Address | Ports Available | Date First Seen | Date Last Seen | Application | Owner Email | Description |
|---|---|---|---|---|---|---|
| 10.1.1.1 | TCP80, TCP443 | 1/12/2012 01:30:30 | 4/28/2013 05:00:00 | www | web@example.com | Front end web service |
| mail.example.com | TCP25, TCP110 | 9/24/2012 04:15:00 | 2/21/2013 16:00:00 | mail | mail@example.com | SMTP and POP service |

2.3. Asset Analyzers

System 100 further comprises one or more asset analysis components 130. The one or more asset analysis components 130 access asset data 135 to determine which security assets 111-113 exist. The one or more asset analysis components 130 then utilize various automated processes to identify certain characteristics of the security assets 111-113. The certain characteristics are characteristics that have security implications.

In an embodiment, an asset analysis component 130 may interface directly with security assets 111-113 over insecure network 110 to identify these characteristics. For example, an asset analysis component 130 may send certain predefined commands to security assets 111-113 designed to fetch information from which certain characteristics may be derived. As another example, an asset analysis component 130 may crawl web pages returned by various assets 111-113, looking for information indicative of various characteristics. In an embodiment, an asset analysis component 130 may also or instead identify characteristics by interacting with other sources of information, such as repositories of project metadata maintained by software development tools used to create certain security assets 111-113.

Examples of discoverable characteristics that have security implications include, without limitation: general characteristics such as an asset owner, an associated email address, an asset description, or an application type; exposure characteristics such as whether the asset is reachable from an arbitrary IP address or whether the asset is behind a load balancer; encryption characteristics such as whether the system uses an encrypted service, a certificate authority that issued a certificate for the encrypted service, key size of the certificate, or expiry of the certificate; interactivity characteristics such as whether the asset has a login form, whether the asset has a search field, whether the asset has certain other designated input controls, or a total count of input controls exposed by the asset; and/or backend characteristics such as a list of plugins or frameworks relied upon by the security asset, a web/application server version number, a JavaScript framework version number, a number of In an embodiment, an asset analysis component 130 operates asynchronously with respect to the one or more input collectors 120, in that the asset analysis component 130 runs on a separate schedule, independent from the operation of the one or more input collectors 120. In an embodiment, an input collector 120 is also or instead configured to command an asset analysis component 130 to analyze assets after the input collector 120 has finished running. In an embodiment, an asset analysis component 130 periodically monitors asset data 135 for new assets, and then promptly analyzes those new assets. In an embodiment, an asset analysis component 130 is periodically scheduled to analyze all security assets, regardless of whether the security assets are new. In an embodiment, an input collector 120 may also function as an asset analysis component 130.

2.4. Test Management Engine

System 100 further includes one or more test management engines 180. The one or more test management engines 180 execute various procedures for detecting security vulnerabilities in security assets 111-113. These procedures are described by tests 185. For example, tests 185 may each be a file or suite of files comprising executable instructions in any suitable language, such as Python or Java. The one or more test management engines 180 are configured to execute these instructions with respect to a given security asset, and to interpret any result data as a test result. The one or more test management engines 180 are configured to store some or all of the test results in test data 195, along with metadata indicating which security asset was tested, which of tests 185 were performed, and when those test(s) 185 were performed.

Any type of security vulnerability may be tested for, depending on the embodiment. The testing procedures may involve, for example, sending various commands to assets 111-113 over the insecure network 110 to determine the configuration of the assets 111-113 and/or attempt to force assets 111-113 to perform functions that are generally considered to be undesirable. A large number of testing procedures are known and/or will continue to be developed. Thus, the exact testing procedures used will vary from embodiment to embodiment.

In an embodiment, a test management engine 180 selects which of tests 185 to perform on which security assets 111-113 based on the data stored in asset data 135. For example, test management engine 180 may be configured to only perform a certain test on assets of certain application types or assets running certain versions of software, because the security vulnerability tested for by the certain test is only possible at those types of assets. The test management engine 180 may access the asset data 135 through a query handler 160, which is a database server or other appropriate query engine for looking up specific data elements in asset data 135. In other embodiments, test management engine 180 simply performs all tests 185 on all assets 111-113.

In an embodiment, a test management engine 180 provides an API by which other components, such as scheduler 150, prioritization component 170, monitoring component 140, and/or user interface 105, may send the test management engine 180 commands to test one or more specific security assets. Depending on the embodiment, the commands may specify a set of one or more specific security assets to test by referencing identifiers found in asset data 135, characteristics associated with the one or more security assets in asset data 135, and/or descriptions of the one or more security assets.

In an embodiment, an optional command parameter may include an identification of one or more specific tests 185 to perform. In an embodiment, an optional command parameter may include priorities assigned to the specified one or more security assets, and or to specified tests 185. In other embodiments, the API may support a variety of additional parameters and/or commands for instructing the test management engine 180 regarding how to perform various tests 185 on one or more of security assets 111-113. The API may further support other commands, such as commands for checking text execution statuses, commands for retrieving test results, and so forth.

One example of a suitable test management engine 180 is the open-source security testing framework Minion, distributed by Mozilla. However any other suitable framework may be used. Examples of useful tests 185 include, without limitation, the open-source projects Arachni, nmap, ZAP, and skipfish.

2.5. Scheduler

System 100 further comprises a scheduler component 150. Scheduler component 150 instructs a test management engine 180 to test various security assets 111-113 according to defined schedules, such as at predefined intervals, at a certain time of day, on a monthly basis, and so on. Scheduler component 150 may determine these schedules using schedule data that defines the schedules globally, per-characteristic, per-group, and/or for individual security assets. The schedule data may be hard-coded according to security protocols and/or adjusted, for instance, using user interface 105. Scheduler component 150 maintains timing data referred to herein as timers to determine when various scheduled periods of time defined by the schedule data have lapsed. When a timer indicates the lapsing of a period of time, scheduler component 150 takes appropriate actions, such as instructing a test management engine 180 to test a security asset associated with the timer.

In an embodiment, scheduler 150 is only configured to ensure that a security asset has been tested at least once in a period of time defined by the schedule data, and thus may not necessarily instruct the test management engine 180 to actually test the security asset within that period of time. For example, other components may command test management engine 180 to test the security asset. Scheduler 150 may thus at various times query test data 195 to determine when the security asset was last tested. If the security asset has not been tested within the period of time defined by the schedule data, scheduler 150 commands the test management engine 180 to test the security asset. If the security asset has been tested within the period of time, scheduler 150 does not instruct the test management engine 180 to test the security asset, but rather sets a timer to once again check whether the security asset has been tested after the period of time will have lapsed since the security asset was last tested. In an embodiment, to reduce or eliminate scheduler 150 checking when a security asset was last tested, test management engine 180 may be configured to instruct scheduler 150 to reset a security asset's timer whenever the security asset is tested.

2.6. Monitoring Component

System 100 further comprises one or more monitoring components 140. The one or more monitoring components 140 monitor some or all of assets 111-113 for changes that indicate that assets require testing. A monitoring component 140 may monitor for any detectable change, or may simply monitor for changes of types that are known to possibly introduce a security vulnerability. A monitoring component 140 may monitor for changes by interacting with assets 111-113 over the insecure network 110 and/or by interacting with other sources of information, such as repositories of project metadata maintained by software development tools used to create certain security assets 111-113. When a monitoring component 140 discovers a change in a security asset, the monitoring component 140 instructs test management engine 180 to re-test the security asset.

In an embodiment, a monitoring component 140 is configured to actively monitor asset data 135 for changes. A change is detected any time certain fields in the asset data 135 change. The monitored fields may include all fields, or just user-specified fields. For example, a change may be detected whenever an asset is added to the asset data, whenever a port or address is added or changed for the asset, or whenever an owner of the asset changes. In an embodiment, rather than actively monitor for these changes, the monitoring component may be configured to respond to database triggers that are executed whenever there is a change in an associated field of interest.

In an embodiment, a monitoring component 140 is configured to actively monitor asset metadata 114. Asset metadata 114 may include, for instance, version metadata that specifies application versions. A change in such version metadata, or in other suitable asset metadata 114, may signal changes in underlying code for those applications and/or configurations of the systems that run those applications. Thus, the monitoring component 140 may base a determination that the asset has changed on certain changes in the asset metadata.

In an embodiment, a monitoring component 140 is configured to actively monitor a build system for changes in build jobs. A build system periodically compiles computer code and/or performs other administrative tasks by which the various software components of a security asset are generated. Build jobs are data constructs that define the steps involved in generating these software components. If a build job has been linked to an asset in asset data 135, then a change in the steps defined for that build job may signify the introduction of a new security vulnerability. Thus, the monitoring component 140 may instruct a test management engine 180 to test the linked security asset.

In an embodiment, a monitoring component 140 is configured to actively monitor for changes in a source code repository linked to a security asset by asset data 135. The monitoring component 140 is configured to determine when any change to a source code repository occurs, or only when a certain branch or project in the source code repository changes. In an embodiment, different branches or projects of a single source code repository may even be associated with different security assets in asset data 135. The monitoring may comprise maintaining a history of the previous state of the source code and comparing that history to the current state of the source code, or the monitoring may simply comprise interacting with a version control system such as CVS or Git to determine when the source code was last updated. In an embodiment, certain types of changes may be ignored, such as changes that only affect developer comments or language localization code.

In an embodiment, a monitoring component 140 is configured to actively monitor for changes in the content returned by an asset in responses to various commands. For example, the monitoring component 140 may crawl a website returned by the asset and compare the content returned to content previously returned. The monitoring component 140 may employ various tests to determine whether a given web page or other resource has changed. For example, the monitoring component 140 may perform a simple comparison of HTML content for a web page, or the monitoring component may perform more complex tests that involve constructing a Document Object Model, executing JavaScript code, and/or analyzing non-text files such as images or videos. Depending on the embodiment, certain changes may be ignored. For example, in an embodiment, minor aesthetic changes that do not affect content may be ignored. As another example, in an embodiment, changes that do not affect input forms or JavaScript code may be ignored.

In an embodiment, a monitoring component 140 performs any combination of one or more of the above monitoring techniques. In an embodiment, separate monitoring components 140 exist for different techniques. System 100 may support a modular monitoring component framework by which new monitoring components supporting new techniques may easily be added.

In an embodiment, a monitoring component 140 has interactions with assets 111-113 that are similar to interactions between an asset analysis component 130 and assets 111-113. Thus, the monitoring component 140 and the asset analysis component 130 may be a same component. In other embodiments, the one or more monitoring components 140 may be entirely separate from the one or more asset analysis components 130, and operate asynchronously with respect to the one or more asset analysis components 130. The active monitoring processes performed by a monitoring component 140 may occur at any suitable frequency, such as on a daily, weekly, or hourly basis, or as often as possible given the system resources available to the one or more monitoring components.

2.7. Prioritization Component

System 100 further comprises a prioritization component 170. Prioritization component 170 prioritizes security assets 111-113 for testing based on filters and/or rules 175. Filters and/or rules 175 are data constructs that indicate priorities for groups of the security assets described by asset data 135 based on their associated characteristics. Security assets may be prioritized or otherwise selected based on any characteristic stored in asset data 135, including those described herein.

For example, a rule 175 may assign a high priority to a group of assets that are characterized as web servers. As another example, a rule 175 may assign a high priority to assets that are both associated with a specific group of virtual server accounts and running on systems behind a load balancer. As another example, a rule 175 may assign a high priority to assets that comprise SSL servers hosted by third-party providers, with certificates issued by a specific certificate authority. Prioritization component 170 determines these groups of assets by querying query handler 160 for assets matching characteristics specified by the rules/filters 175. In an embodiment, prioritization component 170 is further configured to utilize filters and/or rules 175 that consider test data 195, such as how recently an asset has been tested, or how frequently security vulnerabilities have arisen at an asset over a certain time period. In an embodiment, system operators may manually designate high priority assets in asset data 135.

In an embodiment, prioritization component 170 sends instructions to a test management engine 180 to execute tests on groups of assets designated as having high priority. These instructions may be sent periodically, during system downtime, at the request of a system operator, and so forth. In an embodiment, a test management engine 180 is configured to test security assets identified by prioritization component 170 before those identified by scheduler 150 and/or monitoring component 140. However, other embodiments do not necessarily test security assets identified by the prioritization component 170 first. In an embodiment, a system operator may access prioritization component 170 through user interface 105 and request that prioritization component 170 provide a list of assets meeting particular criteria. The system operator may then instruct system 100 to test some or all of the assets in the list.

In an embodiment, prioritization component 170 communicates with or is even integrated into a test management engine 180 so that the test management engine 180 may determine an appropriate order for testing a group of security assets. Such prioritization may be necessary if the test management engine 180 is incapable of immediately executing all tests that have been commanded by monitoring process 140, scheduler 150, and/or user interface 105. For example, for performance reasons, a test management engine 180 may be restricted to only performing a certain number of tests at a time, and/or consuming only a certain amount of system resources at a time. Accordingly, the test management engine 180 may create a queue of security assets that require testing, and command or otherwise rely on prioritization component 170 to order the queue by the priorities defined by filters and/or rules 175. Whenever the test management engine 180 is capable of testing a new security asset, the test management engine 180 removes the highest priority security asset in the queue and then performs a corresponding one or more of tests 185 on that asset.

Alternatively, prioritization component 170 may maintain such a queue, and each of monitoring process 140, scheduler 150, and/or user interface 105 is configured to instruct prioritization component 170 to add security assets to the queue rather than to directly instruct the test management engine 180 to test security assets. Prioritization component 170 prioritizes the queue, and then instructs a test management engine 180 to test the highest priority security assets according to any suitable resource scheduling logic.

2.8. Reporting Component

System 100 further comprises a reporting component 190. Reporting component 190 generates graphical displays of test data 195. The displays may include tables, graphs, and/or plain-text logs. The graphical displays may involve various levels of aggregation. The graphical displays may be interactive, in that a system operator may customize what data is displayed and/or drill-down into the data. The reporting component 190 may further be configured to recognize when a given test result is significant, and send a notification message, such as an email or text message, of the test result to a system operator. Various thresholds and/or rules may be defined for when a notification is to be delivered. An example of a suitable reporting component is the open-source project Threadfix, by Denim Group.

2.9. User Interface

System 100 comprises interface logic by which a user interface 105 is provided to system operators. User interface 105 may be, for example, a graphical user interface comprising controls for providing various user inputs, such as inputs for configuring the various components described above, or inputs for manipulating the various data elements relied upon by system 100. Alternatively, user interface 105 may be a command-line interface or API for providing such inputs. Examples of functions supported by user interface 105 may include, without limitation, viewing or editing defining asset data 135, setting schedule data, defining filters/rule 175, viewing reports from reporting component 190, sending commands to test management engine 180 or prioritization component 170, adjusting the run frequency or resource usage constraints of the various components of system 100, interfacing with query handler 160, and so forth.

2.10. Miscellaneous

The various data elements described herein may be stored in a variety of manners. For example, each of source definition data 125, asset data 135, filters and rules 175, tests 185, and test data 195 may be stored in a separate one or more database tables, databases, or files in a data repository. Alternatively, some or all of these various data elements may be stored together within one or more combined database tables, databases, and/or files.

System 100 is but one example of a system that is suitable for performing the techniques described herein. Other systems may comprise additional or fewer components in varying arrangements. The division of functions between components may also differ, depending on the embodiment. Systems may monitor any number of security assets discovered from any number of source types.

In an embodiment, test management engine 180 simply tests all of the security assets described by asset data 135, and hence no prioritization component 170, scheduler 150, or monitor 140 is required. In an embodiment, system 100 does not include one or more of the scheduler 150, prioritization component 170, or monitoring component 140. In an embodiment no input collectors 120 are needed. Rather, user interface 105 simply features controls for an operator to manually define assets to add to asset data 135.

3.0. Functional Example

Figure 3:
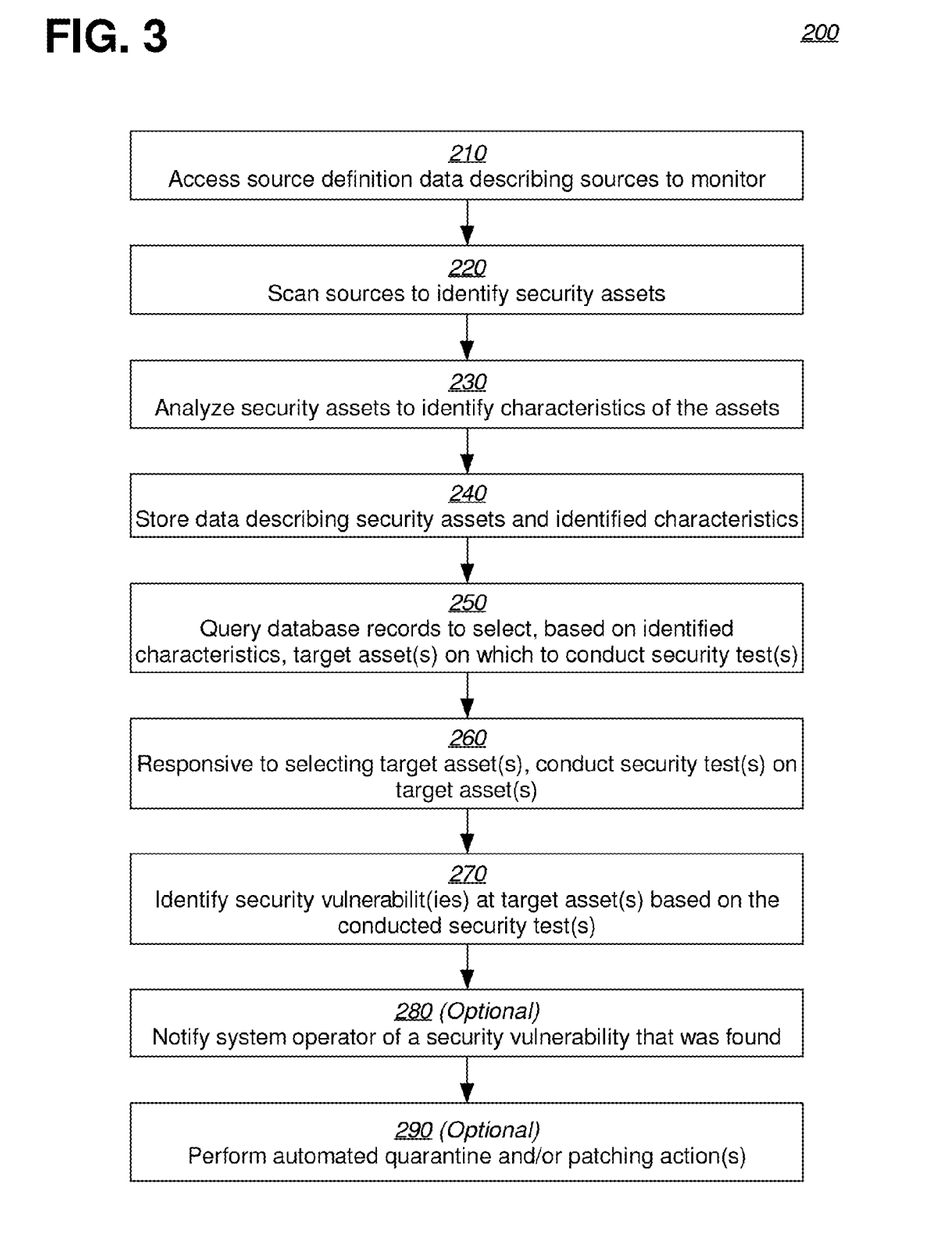
FIG. 3 illustrates an example flow for discovering security assets and testing the security assets for security vulnerabilities.

FIG. 3 illustrates an example flow 200 for discovering security assets and testing the security assets for security vulnerabilities, according to an embodiment. The various elements of flow 200 may be performed by a variety of systems, including systems such as system 100 described above.

Block 210 comprises accessing source definition data describing sources to monitor on one or more computer networks. For example, the one or more input collectors 120 may retrieve source definition data 125 from a file or database. The source definition data comprises source definitions that are classified according to source definition categories. For example, some source definitions may specify IP addresses or other suitable addresses to scan for security assets, by ranges and/or by specific enumerations.

As another example, some source definitions may specify credentials and/or other information necessary to access virtual server account configuration data. For instance, for one type of virtual server account, this data may be elastic load balancer configuration data. As another example, some source definitions may specify domain name server records from which to resolve addresses to scan for security assets. These records may include, for instance, a list of domain names that are owned or managed by the operator and/or DNS zone transfer data, including hostnames, IP addresses, and DNS metadata.

Block 220 comprises scanning sources defined by the source definition data to identify security assets. For example, one or more input collectors 120 may scan sources 115-117 over insecure network 110 and/or over an intranet or other network. The scanning may involve, for example, a port scan of IP addresses specified by or resolved from the source definition data. However, not all types of source definitions may actually require interaction with the security assets over a network. For instance, some source definitions may be of types known to explicitly specify existing security assets, or to reference data at which the security assets are explicitly specified. Block 220 is fulfilled for these sources simply by parsing the source definitions or retrieving the referenced data. For virtual server account source definitions, the virtual server account access information may be used to log-in or otherwise access one or more virtual server accounts. Once logged-in to an account, lists of virtual server instances and/or other configuration data, such as asset metadata 114, may be obtained via various function calls. These virtual server instances may constitute actual security instances, or may simply indicate IP addresses on which to perform a port scan, depending on the embodiment.

In an embodiment, identifying the security assets involves identifying, for each particular security asset, a location at which the particular security asset is accessible. This location may include an address such as an IP address or hostname. In an embodiment, the location may further include a port number and/or service access instructions.

Block 230 comprises analyzing the security assets to identify characteristics of the security assets. For example, the one or more asset analysis components 130 may interact with one or more of assets 111-113 and/or other sources of information, such as repositories of project metadata maintained by software development tools used to create certain security assets 111-113.

According to an embodiment, the identified characteristics for a particular security asset of the security assets include, without limitation, one or more of: a first timestamp for when the particular security asset was first identified based on scanning the sources; a second timestamp for when the particular security asset was last identified based on scanning the sources; a third timestamp for when a particular set of one or more of the one or more security tests was last performed on the particular security asset; one or more application services provided by the particular security asset; contact information for a project owner for the particular security asset; a description of the particular security asset; an indication of whether the particular security asset is accessible from a particular external Internet Protocol address; an indication of whether the particular security asset is behind a load balancer; an indication of whether the particular security asset is an encrypted service; a certificate authority that issued a Secure Socket Layer certificate for the particular security asset; Secure Socket Layer characteristics associated with the particular security asset; an indication of whether the particular security asset provides an input component for receiving user credentials; a count of input fields found in a website provided by the particular security asset; one or more input field types found in a website provided by the particular security asset; one or more software packages upon which the particular security asset relies; user credentials under which the particular security asset executes one or more particular server-based applications; a hosting provider that hosts the particular security asset; or a measurement metric of distance from the security asset to a particular host domain.

Block 240 comprises storing data describing the security assets and the identified characteristics. For example, the information gathered in blocks 220 and 230 may be stored as database records in a data repository such as asset data 135.

Block 250 comprises querying the database records to select, based at least on the identified characteristics, one or more target assets from the security assets on which to conduct one or more security tests. Block 250 may be performed in a variety of manners. For example, a prioritization component 170 or other suitable component may send a query to query handler 160 that selects for security assets that have certain desirable characteristics, such as characteristics that indicate that the security assets have a high priority in accordance to rules/filter 175. For example, one query might select for the top n assets as ranked by number of input fields found at the asset. Another query might select all assets that have changed within a certain amount of time.

In an embodiment, querying the database records may be performed as part of monitoring the security assets for changes to the server-based applications. For example, a monitoring component 140 may query the database to identify information about a security asset to monitor. Based on this information, the monitoring component 140 may determine when a monitored security asset changes. Examples of changes for which security assets are monitored may include, without limitation, changes in the security asset's description or identified characteristics, changes in versioning information, changes in web pages output from the security assets, changes in source code associated with the security assets, or changes in application programming interfaces associated with the security assets.

Accordingly, selecting the one or more target assets in block 250 may comprise selecting a particular target asset because a particular type of change has been monitored with respect to that particular target asset. For example, an aspect of the server-based application corresponding to the particular target asset may have changed, such as content being served by that server-based application, or code used to generate the server-based application. When this change is detected, the particular target asset may be added to a queue of security assets to test for changes.

In an embodiment, flow 200 may comprise an additional step of scheduling jobs to execute periodic security tests for particular assets having one or more particular identified characteristics. For example, a specific security asset may be scheduled for testing each month, or a group of high priority assets may be scheduled for testing each Monday morning. Querying the database records may be performed as part of identifying which security assets need to be tested as part of a scheduled job. Selecting the one or more target assets occurs as part of determining that it is time to run the scheduled jobs.

In an embodiment, block 250 comprises prioritizing the security assets based on the identified characteristics. The prioritizing may involve, for example, selecting a group of high priority security assets based on criteria supplied by a system operator and/or predefined rules or filters. The prioritizing may optionally involve ranking security assets based on comparing the criteria to the information in each security asset's corresponding database record. Selecting the one or more target assets comprises selecting one or more security assets to test based on the prioritizing. For example, the one or more security assets that are chosen may be a group of security assets that match specified criteria, a group of assets having criteria values above a defined threshold, or a certain predefined number of security assets that rank highest according to specified criteria.

Block 260 comprises, responsive to selecting the one or more target assets, conducting the one or more security tests on the one or more target assets. For example, once a monitoring component 140, scheduler 150, or other suitable component has determined that a security asset should be tested, the component may send an instruction to a test management engine 180 to test the security asset for security vulnerabilities. As discussed in the previous section, the actual performance of a security test may be carried out in any suitable manner.

In an embodiment, block 260 further comprises automatically selecting which security tests, of a plurality of possible security tests, to perform on which security assets, based on the identified characteristics. For example, the test management engine 180 may determine which one or more of security tests 185 based on characteristics of the security assets, or the command that instructs test management engine to test the security asset may indicate which one or more of security tests 185 to run.

Block 270 comprises identifying one or more security vulnerabilities at the one or more target assets based on the conducted one or more security tests. For example, each of the one or more tests may generate output describing the result of the test. The output may, for example, specify whether any security vulnerability was found, the type or types of vulnerabilities that was found, information by which an operator may locate and/or reproduce each vulnerability, and so forth. The output may then be stored in a repository of test results. For example, a test management engine 180 may create database records containing or summarizing test results for each test performed, for each security asset, and/or for each security vulnerability found. These records may then be stored in test data 195.

Block 280 comprises optionally notifying a system operator of a security vulnerability that was found. Depending on the embodiment, notifications may be provided for some, all, or no types of vulnerability. In an embodiment, system 100 is configured to allow an operator to change configuration settings that control the types of vulnerabilities for which notifications are provided. For example, a system operator may configure a text management engine 180 to send an email or text message whenever any security vulnerability is found. Or reporting component 190 may be configured to monitor test data 195 and deliver daily digest messages summarizing certain types of vulnerabilities, while providing immediate alerts for other types of vulnerabilities.

Block 290 comprises optionally performing one or more automated quarantine and/or patching actions. For example, system 100 may be configured to automatically respond to certain types of vulnerabilities by taking actions such as changing system permissions, installing patches or updates, hiding an asset behind a firewall, and/or reverting to previous application versions. System 100 may take these actions based on various rules that link certain types of vulnerabilities to defined algorithms for fixing vulnerabilities. Any suitable algorithm may be employed. In an embodiment, a system is further configured to retest an asset once an action has been taken. If the security vulnerability is still found, the system may take additional automated steps for fixing the vulnerability and/or notify a system operator. In other embodiments, no automated actions are taken. Instead, a system operator takes various manual actions to attempt to fix any security vulnerabilities that were found.

Flow 200 is one example of a flow for discovering and testing security assets. Other flows may comprise fewer or additional elements, in varying arrangements. For example, in one embodiment, blocks 210-230 and/or blocks 280-290 are not necessary. In another embodiment, blocks 220-230 may be combined. In an embodiment, blocks 210-230 are performed on a substantially continuous basis, asynchronously with respect to the rest of the elements of flow 200. For example block 220 may be performed as part of a periodic scan of the sources to identify new security assets that come online over the one or more computer networks. Meanwhile, block 230 might be performed as part of a periodic monitoring process of known security assets. In an embodiment, blocks 240-290 are repeated periodically, upon detection of changes in security assets, and/or as resources become available for additional security tests.

4.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
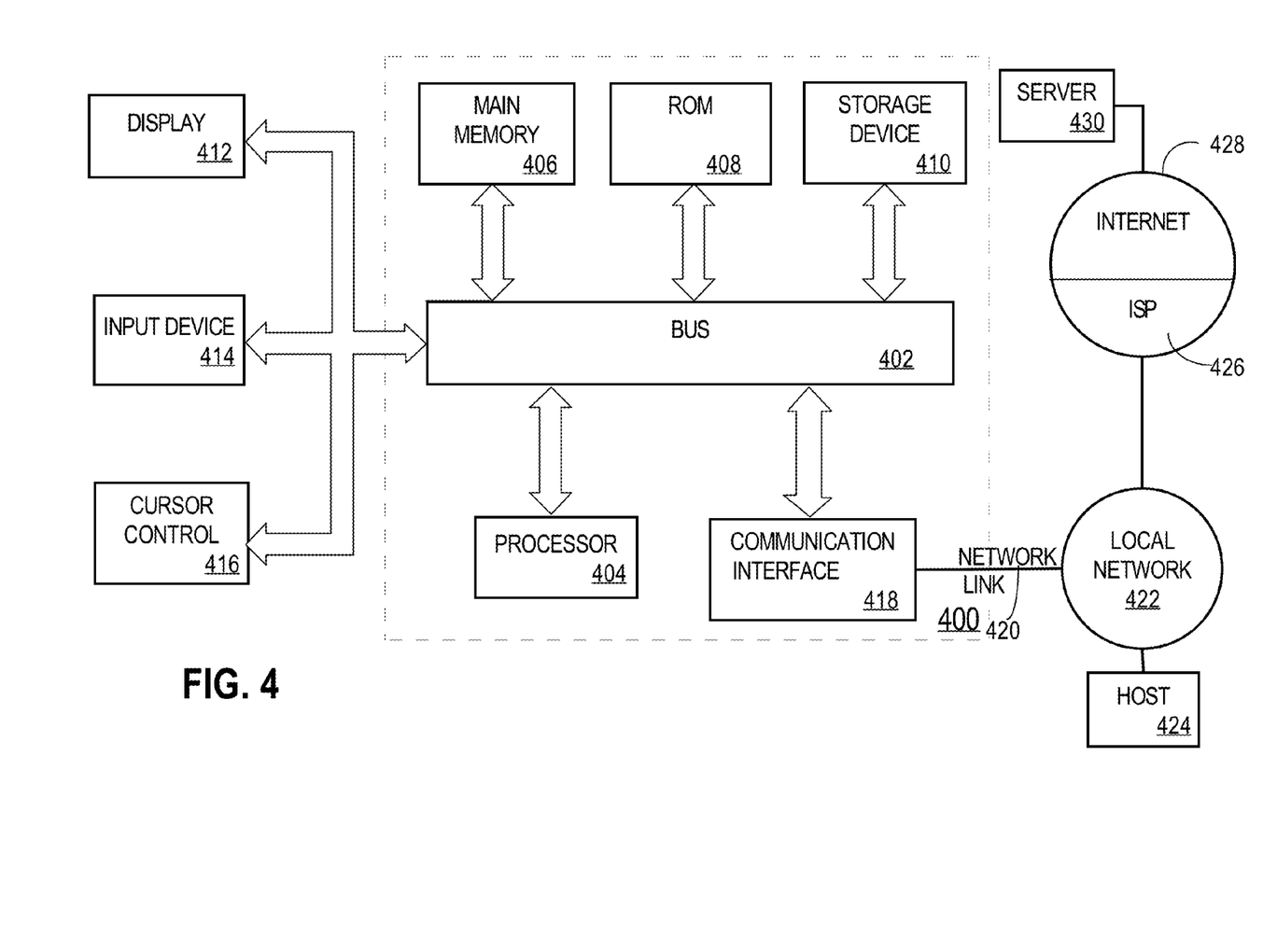
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims

What is claimed is:

1. A computer system comprising:
   a first repository of source definition data describing sources to monitor on one or more computer networks;
   one or more input collectors, coupled to the one or more computer networks, that are configured to:
      scan the sources, and
      identify security assets, wherein the security assets comprise server-side interfaces by which server-based applications interact with client computers over the one or more computer networks;
   a second repository of security asset data that is configured to receive, from the one or more input collectors, data describing the identified security assets;
   a security asset analysis component, coupled to the second repository, that is configured to:
      analyze the security assets described by the security asset data,
      identify characteristics corresponding to the security assets, and
      update the second repository to associate each of the security assets with one or more of the corresponding identified characteristics;
   a query component, coupled to the second repository of security asset data, that is configured to:
      receive queries for a first set of particular security assets each having one or more particular characteristics, and
      receive the first set of particular security assets from the second repository of security asset data based in part on comparing the one or more particular characteristics to the identified characteristics, wherein the first set of particular security assets includes a first security asset on a first source and a second security asset on a second source;
   a prioritization component, coupled to or embedded in the query component, that is configured to generate priority data for sets of particular security assets based on corresponding characteristics of the identified characteristics;
   one or more monitoring components, coupled to the one or more computer networks, that are configured to:
      detect, after the updating of the second repository to associate each of the security assets with the corresponding one or more of the identified characteristics, changes to the server-based applications, and
      identify target assets to be submitted to a test management engine based at least on one of the detected changes to the server-based applications corresponding to a particular target asset of the target,
      wherein the detected changes to the server-based applications comprise one or more changes made to the server-based applications that indicate a possible new security vulnerability to the server-based applications;
   the test management engine, coupled to the one or more computer networks, that is configured to:
      receive requests to execute security tests on the target assets of the security assets,
      identify security vulnerabilities based on executing the security tests on the target assets,
      receive the priority data, and
      test the target assets in orders indicated by the priority data;
   a third repository of security test data that is configured to receive, from the test management engine, results for the security tests, including vulnerabilities data describing the security vulnerabilities; and
   a reporting component that is configured to generate reports of the identified security vulnerabilities based on the third repository of security test data.

2. The system of claim 1, wherein the one or more input collectors include one or more of:
   an Internet Protocol scanner that scans ranges of addresses specified by the source definition data;

a virtual server scanner that accesses virtual server account configuration data, at locations specified by the source definition data, to identify virtual server instances; or a Domain Name Server scanner that scans domain name server records specified by the source definition data.

3. The system of claim 1, wherein the test management engine is configured to receive a first request, of the requests, to execute a first set of the security tests on the first set of particular security assets retrieved by the query component.

4. The system of claim 1, wherein the security asset data for a particular security asset of the security assets include one or more of:
   a location at which the particular security asset is accessible, wherein the location is one of an Internet Protocol address or hostname;
   one or more available ports at the location;
   a first timestamp for when the particular security asset was first identified based on scanning the sources;
   a second timestamp for when the particular security asset was last identified based on scanning the sources; or
   a third timestamp for when a particular set of one or more of the security tests was last performed on the particular security asset.

5. The system of claim 1, wherein the one or more monitoring components include one or more of:
   an inventory monitoring component that is configured to monitor the security asset data for changes in the security asset data or identified characteristics;
   a versioning monitoring component that is configured to monitor versioning information associated with the security assets;
   a site content monitoring component that is configured to monitor for changes in web pages output from the security assets;
   a source code monitoring component that is configured to monitor for changes in source code associated with the security assets; or
   an application programming interface monitoring component that is configured to monitor for changes in application programming interfaces associated with the security assets.

6. The system of claim 1, further comprising a scheduling component that is configured to cause a particular target asset of the target assets to be submitted to the test management engine at least because a certain period of time has elapsed since the particular target asset was last tested.

7. The system of claim 1, further comprising a logic component that is configured to automatically select which security tests, of a plurality of possible security tests, to perform on which security assets, based on the identified characteristics.

8. The system of claim 1, wherein the one or more input collectors are configured to periodically scan the sources to identify new security assets that come online over the one or more computer networks.

9. The system of claim 1, wherein the security asset data for a particular security asset of the security assets includes one or more general characteristics, the one or more general characteristics including one or more of:
   one or more application services provided by the particular security asset;
   contact information for a project owner for the particular security asset; or
   a description of the particular security asset.

10. The system of claim 1, wherein the security asset data for a particular security asset of the security assets includes one or more exposure characteristics, the one or more exposure characteristics including one or more of:
   an indication of whether the particular security asset is accessible from a particular external Internet Protocol address; or an indication of whether the particular security asset is behind a load balancer.

11. The system of claim 1, wherein the security asset data for a particular security asset of the security assets includes one or more encryption characteristics, the one or more encryption characteristics including one or more of:
   an indication of whether the particular security asset is an encrypted service;
   a certificate authority that issued a Secure Socket Layer certificate for the particular security asset; or
   Secure Socket Layer characteristics associated with the particular security asset.

12. The system of claim 1, wherein the security asset data for a particular security asset of the security assets includes one or more interactivity characteristics, the one or more interactivity characteristics including one or more of:
   an indication of whether the particular security asset provides an input component for receiving user credentials;
   a count of input fields found in a website provided by the particular security asset; or
   one or more input field types found in a website provided by the particular security asset.

13. The system of claim 1, wherein the security asset data for a particular security asset of the security assets includes one or more backend characteristics, the one or more backend characteristics including one or more of:
   one or more software packages upon which the particular security asset relies;
   user credentials under which the particular security asset executes one or more particular server-based applications;
   a hosting provider that hosts the particular security asset; or
   a measurement metric of distance from the security asset to a particular host domain.

14. A data processing method comprising:
   based on source definition data describing sources to monitor on one or more computer networks, scanning the sources;
   identifying security assets, wherein the security assets comprise server-side interfaces by which server-based applications interact with client computers over the one or more computer networks;
   analyzing the security assets;
   identifying characteristics of the server-based applications;
   storing database records describing the security assets and the identified characteristics;
   querying the database records based on target characteristics;
   receiving a first set of security assets based at least on the target characteristics, wherein the first set of security assets includes a first security asset on a first source and a second security asset on a second source;
   selecting, based at least on the identified characteristics, one or more target assets, from the first set of security assets, on which to conduct one or more security tests;
   after storing the database records, monitoring the security assets for changes to the server-based application, wherein changes to the server-based applications comprise one or more changes made to the server-based applications that indicate a possible new security vulnerability to the server-based applications;

prioritizing the security assets based on the identified characteristics;

selecting one or more target assets to be tested, wherein at least one particular target asset of the one or more target assets is selected based on the prioritizing and because a particular change has been monitored with respect to a particular server-based application corresponding to the particular target asset;

responsive to selecting the one or more target assets, conducting the one or more security tests on the one or more target assets;

identifying one or more security vulnerabilities at the one or more target assets based on the conducted one or more security tests;

wherein the method is performed by one or more computing devices.

15. The method of claim 14, wherein the source definition data comprises source definitions that are classified according to source definition categories, wherein the source definition categories include at least:

a first category for first source definitions that specify ranges of addresses to scan for security assets;

a second category for second source definitions that specify how to access virtual server account configuration data, from which to identify virtual server instances to scan for security assets; and a third category for third source definitions that specify domain name server records from which to resolve addresses to scan for security assets.

16. The method of claim 14, wherein identifying the security assets comprises identifying, for each particular security asset, a location at which the particular security asset is accessible, and one or more available ports at the location, wherein the location is one of an Internet Protocol address or hostname.

17. The method of claim 14, wherein monitoring the security assets for changes comprises one or more of:

monitoring the database records for changes in the security asset data or identified characteristics;

monitoring versioning information associated with the security assets; monitoring for changes in web pages output from the security assets;

monitoring for changes in source code associated with the security assets; or monitoring for changes in application programming interfaces associated with the security assets.

18. The method of claim 14, further comprising:

scheduling jobs to execute periodic security tests for particular assets having one or more particular identified characteristics;

selecting the one or more target assets as part of selecting to run the scheduled jobs.

19. The method of claim 14, further comprising automatically selecting which security tests, of a plurality of possible security tests, to perform on which security assets, based on the identified characteristics.

20. The method of claim 14, further comprising periodically scanning the sources to identify new security assets that come online over the one or more computer networks.

* * * * *